(12) United States Patent
Gill et al.

(10) Patent No.: US 9,164,239 B2
(45) Date of Patent: Oct. 20, 2015

(54) METHOD AND APPARATUS FOR OPTICALLY FILTERING A COMMUNICATION SIGNAL

(75) Inventors: Douglas M. Gill, South Orange, NJ (US); Mahmoud Rasras, New Providence, NJ (US); Kun-Yii Tu, Califon, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1383 days.

(21) Appl. No.: 11/376,491

(22) Filed: Mar. 15, 2006

(65) Prior Publication Data

US 2007/0217737 A1 Sep. 20, 2007

(51) Int. Cl.
  *G02B 6/27* (2006.01)
  *G02B 6/293* (2006.01)
  *G02B 6/42* (2006.01)
  *H04B 10/2507* (2013.01)
  *H04B 10/50* (2013.01)
  *H04B 10/67* (2013.01)

(52) U.S. Cl.
  CPC ............ *G02B 6/2746* (2013.01); *G02B 6/2935* (2013.01); *G02B 6/29395* (2013.01); *G02B 6/4206* (2013.01); *G02B 6/4246* (2013.01); *H04B 10/2507* (2013.01); *H04B 10/50* (2013.01); *H04B 10/675* (2013.01)

(58) Field of Classification Search
  None
  See application file for complete search history.

(56) References Cited

U.S. PATENT DOCUMENTS

| 4,399,563 | A | * | 8/1983 | Greenberg | ...................... 398/41 |
| 5,351,325 | A | * | 9/1994 | Miller et al. | ................... 385/42 |
| 5,623,565 | A | * | 4/1997 | Blair et al. | ...................... 385/24 |
| 6,172,791 | B1 | | 1/2001 | Gill | |
| 6,271,959 | B1 | * | 8/2001 | Kim et al. | ..................... 359/325 |
| 6,304,369 | B1 | * | 10/2001 | Piehler | ...................... 359/337.4 |
| 6,501,867 | B2 | | 12/2002 | Gates, II | |
| 6,539,131 | B1 | | 3/2003 | Gill | |
| 6,694,082 | B2 | * | 2/2004 | Hwang et al. | ................. 385/129 |

(Continued)

FOREIGN PATENT DOCUMENTS

| EP | 0 403 991 | 6/1990 |
| EP | 1 024 378 A2 | 1/2000 |

(Continued)

OTHER PUBLICATIONS

European Patent Office—Notification of Transmittal of the International Search Report and the Written Opinion of the International Searching Authority, or the Declaration.

(Continued)

*Primary Examiner* — Uyen Chau N Le
*Assistant Examiner* — Hoang Tran
(74) *Attorney, Agent, or Firm* — Fletcher Yoder PC

(57) ABSTRACT

There is provided a method and apparatus for optically filtering a communication signal. More specifically, in one embodiment, there is provided an apparatus comprising an optical filter having first and second input ports and first and second output ports, the optical filter being configured to transmit light in a target frequency range to the first output port in response to receiving light at the first input port and being configured to transmit light in the target frequency range to the second input port in response to receiving light at the second output port, and first and second photodiodes, the first diode being located to be illuminated by light from the first output port and the second photodiode being located to be illuminated by light from the second input port.

20 Claims, 4 Drawing Sheets

(56) References Cited

U.S. PATENT DOCUMENTS

| | | |
|---|---|---|
| 6,704,557 B1 | 3/2004 | Krishnamurthy |
| 6,711,308 B2 | 3/2004 | Erben |
| 6,819,808 B2 | 11/2004 | Erben |
| 6,842,431 B2 * | 1/2005 | Clarkson et al. ............. 370/254 |
| 6,931,180 B2 | 8/2005 | Madsen |
| 6,934,446 B2 | 8/2005 | Rasras |
| 2004/0136634 A1 | 7/2004 | Chowdhury |
| 2005/0041981 A1 | 2/2005 | Gill |
| 2005/0152648 A1 | 7/2005 | Madsen |
| 2005/0286109 A1 | 12/2005 | Gill |
| 2005/0286825 A1 | 12/2005 | Gill |
| 2005/0286911 A1 | 12/2005 | Doerr |
| 2007/0047972 A1 * | 3/2007 | Ikeuchi et al. ............... 398/207 |

FOREIGN PATENT DOCUMENTS

| | | |
|---|---|---|
| JP | 5091047 | 4/1993 |
| WO | WO 00/51271 | 8/2000 |

OTHER PUBLICATIONS

Korean Office Action mailed Oct. 19, 2012 and the translation.

* cited by examiner

METHOD AND APPARATUS FOR OPTICALLY FILTERING A COMMUNICATION SIGNAL

STATEMENT OF GOVERNMENT FUNDED RESEARCH

The U.S. Government has a paid-up license in this invention and the right, in limited circumstances, to require the patent owner to license others on reasonable terms as provided for by the terms of Grant No. HR0011-05-C-0027 awarded by the Defense Advanced Research Projects Agency's Microsystems Technology Office.

BACKGROUND

1. Field of the Invention

This invention relates generally to the filtering of communication signals

2. Discussion of the Related Art

This section is intended to introduce the reader to various aspects of art that may be related to various aspects of the present invention, which are described and claimed below. This discussion is believed to be helpful in providing the reader with background information to facilitate a better understanding of the various aspects of the present invention. Accordingly, it should be understood that these statements are to be read in this light, and not as admissions of prior art.

Since Nikola Tesla built the first radio over one hundred years ago, communication signals, such as electromagnetic ("EM") signals and/or radio frequency ("RF") signals have been used extensively for wirelessly transmitting information and/or data from one location to another. For most of the twentieth century, the primary applications for EM waves employed the lower frequency (under 1 gigahertz) signals, such as radio, television, and so forth. Over the past few years, however, higher frequency waves (1+ gigahertz), such as microwave transmissions, have become increasing common in communication applications.

In addition to having the capacity to carry a greater amount of digital information, these higher frequency EM waves are also particularly amenable to being combined and transmitted from point to point as a single "broadband" EM signal. More specifically, information and/or data can be modulated into a plurality of signals, each of which employs one of a plurality of carrier frequencies across a frequency range. For example, with a frequency range between 1 gigahertz and 10 gigahertz, one carrier frequency may use the 1 gigahertz band, another the 2 gigahertz band, and so forth. These single band transmissions (also referred to as "narrowband" transmissions) can be conglomerated together and transmitted together from one location to another as a broadband signal. At the receiving end, a wireless receiver can divide (e.g., filter) the broadband signal back into the plurality of narrowband transmissions, each of which can be demodulated and decoded.

There are a variety of different techniques for dividing or filtering the broadband signal into the one or more narrowband signals. One technique involves modulating the EM broadband signal onto an optical carrier (e.g., a laser) and then filtering out the desired narrowband region from the optical signal with an optical filter. However, optically carrying a broadband signal can introduce relative intensity noise ("RIN"). This RIN can decrease the signal to noise ratio of the narrowband signals, and, thus, can make it more difficult to demodulate and/or decode the narrowband signals. Some systems attempt to suppress the effects of RIN by splitting the optical signal into two parts and then employing a pair of optical filters to filter the signals. Disadvantageously, the two optical filters typically have to undergo a complex balancing and tuning process to work together efficiently. In addition, the pair of optical filters can also occupy a significant amount of space and draw a significant amount of power.

An improved system or method for optically filtering communication signals would be desirable.

SUMMARY

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

There is provided a method and apparatus for optically filtering a communication signal. More specifically, in one embodiment, there is provided an apparatus comprising an optical filter having first and second input ports and first and second output ports, the optical filter being configured to transmit light in a target frequency range to the first output port in response to receiving light at the first input port and being configured to transmit light in the target frequency range to the second input port in response to receiving light at the second output port, and first and second photodiodes, the first diode being located to be illuminated by light from the first output port and the second photodiode being located to be illuminated by light from the second input port.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions should be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments described below may be directed towards a system and method for optically filtering a communication signal, such as an electromagnetic ("EM") signal.

More specifically, one or more of the embodiments described herein may be directed towards an exemplary optical filter assembly including a modulator configured to split an optical beam into two beams that are modulated in a complementary way by an EM input. The exemplary optical filter assembly also may include an optical filter configured to filter the modulated optical beams for a target frequency band, and optical detectors configured to convert filtered optical beams into one or more EM outputs.

Figure 1:
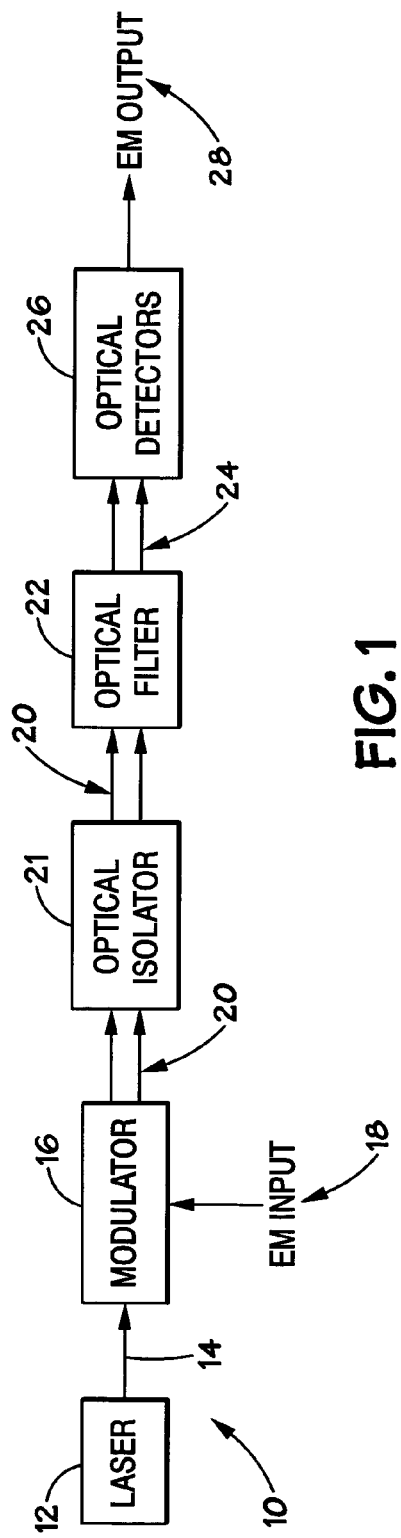
FIG. 1 is a block diagram of an exemplary optical filter assembly in accordance with one embodiment.

Turning now to FIG. 1, a block diagram of an exemplary optical filter assembly in accordance with one embodiment is illustrated and generally designated by a reference numeral 10. As illustrated in FIG. 1, the filter assembly 10 may include a laser 12, a modulator 16, an optical isolator 21, an optical filter 22, and optical detectors 26. In one embodiment, the optical filter assembly 10 may be a part of a wireless receiver. For example, the optical filter assembly 10 may be constructed on a silicon substrate or semiconductor employed in a wireless receiver. In alternate embodiments, the optical filter assembly 10 may also be employed in other suitable types of wireless equipment or other suitable types of receivers.

The laser 12 may include any device or component suitable for producing an optical beam 14, such as a laser beam or other suitable coherent optical beam, that can be modulated with an EM input 18, as described below. In one embodiment, the laser 12 may include one or more laser diodes. In other embodiments, alternate suitable forms of laser generation devices and optical beam generation devices may be employed.

As illustrated in FIG. 1, the laser 12 may project the optical beam 14 to a tunable interferometer, such as the modulator 16, that is configured to modulate the optical beam 14 responsive to a modulation signal received at the EM input 18. For example, in one embodiment, the optical beam 14 may be a laser beam with a frequency of several hundred terahertz, and the EM input 18 may be a broadband signal carrying frequencies between one megahertz and a few hundred gigahertz (i.e., frequencies in the microwave or millimeter range). In this case, the modulator 16 may be configured to modulate the EM broadband signal (including all of the single band or narrowband signals contained therein) onto the optical beam 14. In alternate embodiments, the EM input 18 may be a carrier wave of any other suitable frequency, such as a millimeter waveform, for example.

The modulator 16 may also be configured to split the optical beam, once modulated, into a pair of complementarily modulated optical beams 20. For example, in one embodiment, the modulator 16 includes a 1-by-2 Mach-Zehnder modulator that is configured both to modulate the optical beam 14 and to split the modulated optical beam into two modulated optical beams 20, each of which has approximately half the average power of the original optical beam 14. For example, in one embodiment, the modulator is configured to produce two modulated optical beams with ideally the same average power. More specifically, those of ordinary skill in the art will appreciate that the modulator 16 may include two modulation "arms" that are configured to generate two modulated optical beams 20 that have an opposite polarity to their modulation (i.e., each optical beam carries a signal that is complementary, or of opposite polarity, to the other). For example, one of the arms of the modulator 16 may generate a optical beam that is in-phase with the EM input 18 at approximately fifty-percent of the average power of the optical beam 14; whereas the other arm may generate another optical beam (also at approximately fifty-percent average power) that is the complement of the EM input 18 (i.e., approximately 180 degrees out-of-phase with the EM input 18). In other words, when one of the optical beams 20 is "on", the other is "off" and vice-versa.

The modulator 16 may be configured to transmit the two modulated optical beams 20 to the optical isolator 21. As will be described further below, the optical isolator 21 is configured to prevent the optical filter 22 from directing light back into the modulator 16. In alternate embodiments, however, the optical isolator 21 may be a part of the modulator 16, the optical filter 22, or another component of the optical filter assembly 10.

As illustrated in FIG. 1, the optical beams 20 may pass through the optical isolator 21 and enter the optical filter 22. As will be described in greater detail below with regard to FIGS. 2 and 3, the optical filter 22 may be configured to filter the two modulated optical beams 20 for a selected "target" narrowband frequency range (also referred to as the "passband") within the broadband optical beam 20 and to direct the two optical beams 24 carrying the passband frequency range to the optical detectors 26. In one embodiment, the optical filter 22 is a pole/zero filter. Alternatively, the optical filter 22 may be configured to block a target narrowband frequency (referred to as a "stopband") while allowing other non-stopband frequencies of light to pass through the filter. In other words, the optical filter would select the non-stopband frequencies.

The optical detectors 26 may then be configured to convert the narrowband optical beams 24 into an EM output 28. In one embodiment, the optical detectors 26 may include a pair of balanced transimpedance amplifiers and photodiodes, configured to receive the two optical beams 24 and to convert the received optical beams into an electronic signal. In one embodiment, the optical detectors 26 may be configured to perform a subtraction operation on the electronic signals, which are representative of the optical beams 24. As described further in regard to FIGS. 2 and 3, performing a subtraction operation on the optical beams 24 may facilitate the removal of RIN from the electronic signals representative of the optical beams 24.

Figure 2:
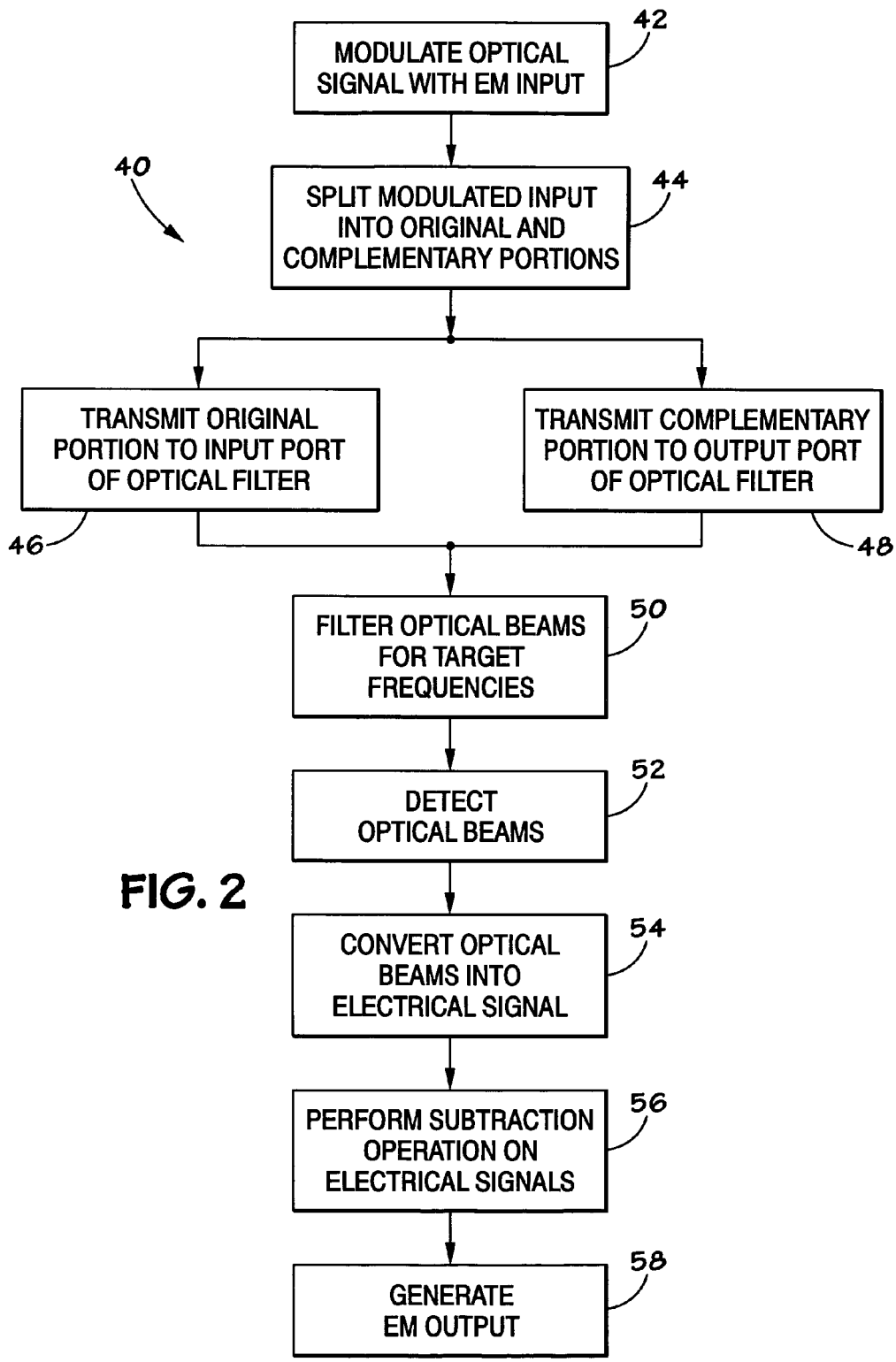
FIG. 2 is a flow chart illustrating an exemplary technique for optically filtering a communication signal in accordance with one embodiment.
Figure 3:
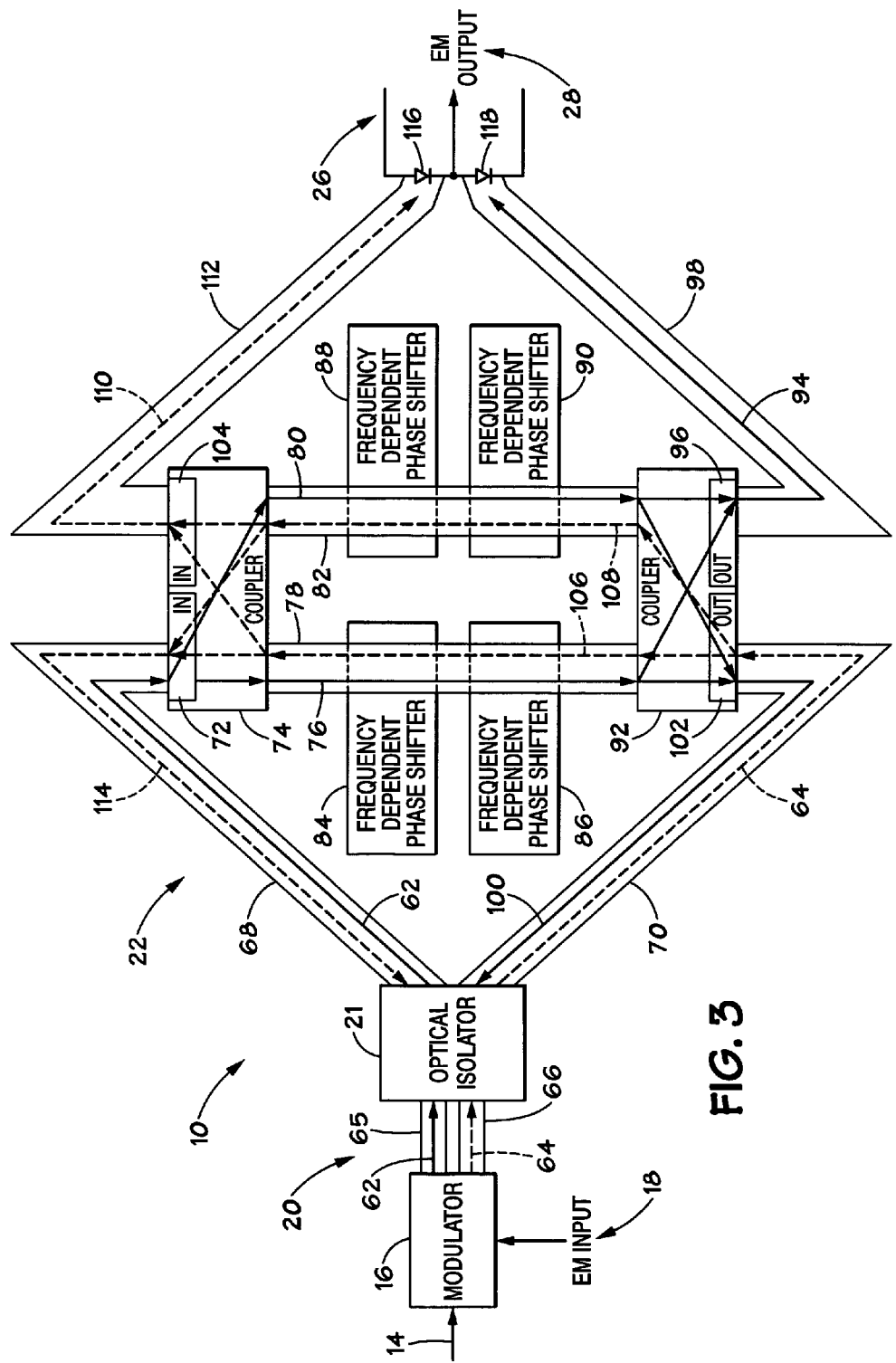
FIG. 3 is a more detailed block diagram of the exemplary optical filter assembly of FIG. 1 in accordance with one embodiment.

FIGS. 2 and 3 provide a more detailed description of one embodiment of the optical filter assembly 10. For example, FIG. 2 is a flow chart illustrating an exemplary technique 40 for optically filtering an EM signal in accordance with one embodiment. For ease of description, the technique 40 illustrated in FIG. 2 will be described in conjunction with FIG. 3, which illustrates a more detailed block diagram of the exemplary optical filter assembly 10 illustrated in FIG. 1. Moreover, for simplicity, like reference numerals have been used to designate those features of FIG. 3 previously described with regard to FIG. 1.

Looking first to FIG. 2, the technique 40 may begin with the modulator 16 modulating the optical beam input 14 with the EM input 18, as indicated by block 42. For example, as described above, the modulator 16 may modulate a coherent optical beam with a frequency in the terahertz range using an EM input 18 in the gigahertz frequency range. While modulator 16 modulates the EM input 18 onto the optical beam 14, it may split the optical beam 14 into two separate modulated optical beams: a first modulated optical beam 62 that has the same phase as the EM input 18 and a second modulated optical beam 64 that has an opposite (complementary) phase to the EM input 18, as illustrated in FIG. 2. For ease of illustration and description, the first modulated optical beam 62 and its progeny are depicted in FIG. 3 using solid lines and the second modulated optical beam 64 and its progeny are illustrated in FIG. 3 using dotted lines As illustrated in FIG. 3, the first modulated optical beam 62 and the second modulated optical beam 64 may travel from the modulator 16 to the optical isolator 21 via optical waveguides 65 and 66, respectively. In one embodiment, the waveguides 65 and 66 may be a light tube or fiber-optic cable. In another embodiment, the waveguides 65 and 66 may be constructed on a silicon substrate. In still other embodiments, the waveguides 65 and 66 may be omitted or replaced with other suitable light transmission mechanisms.

The beams 62 and 64 travel through the waveguides 65 and 66 to the optical isolator 21. As those of ordinary skill in the art will appreciate, the optical isolator 21 allows the first modulated optical beam 62 and the second modulated optical beam 64 to pass through it from the modulator 16, but prevents light from the optical filter 22 (as described below) from shining back into the modulator 16 from the optical filter 22. In other words, the optical isolator 21 effectively functions as a "one-way mirror" allowing the first modulated optical beam 62 and the second modulated optical beam 64 to pass through it while preventing any light from passing back through it in the opposite direction.

As illustrated, the beams 62 and 64 come out of the optical isolator and they travel along the waveguides 68 and 70 to the filter 22. As with the waveguides 65 and 66 and the remainder of the waveguides described herein, the waveguides 68 and 70 may be a light tube, a fiber-optic cable, a component constructed on a silicon substance, or any other suitable form of light transmission mechanism.

The operation of the filter 22 will be described next. For ease of description, the progress of the first modulated optical beam 62 will be described first and the progress of the second modulated optical beam 64 will be described second. The light beam 62 may proceed along the waveguide 68 and enter into the filter 22 through an input port 72 of a coupler 74. In one embodiment, the coupler 74 includes a three decibel ("3 dB") directional evanescent coupler with a coupling ratio of 0.5. In alternate embodiments, the coupler 74 may employ another suitable dB rating and/or employ another suitable coupling ratio from 0.01 to 1.0. Moreover, in one embodiment, the input port 72 will be part of a coupler 74 that includes the input port 72 and a second input port 104 (described further below). Those of ordinary skill in the art will appreciate that the term "input port" as used in regard to the input ports 72 and 104 is a naming convention applied to label the ports that enable light to shine into and out of the optical filter 22. As such, the input ports 72 and 104 (as well as the output ports described below) are actually bi-directional ports that can be employed, as described herein, to either bring light into the optical filter 22 or to allow light to pass out of the optical filter 22. In other words, it is possible to either input light or output light from the optical filter 22 through the input ports 72 and 104 or the output ports described below.

The coupler 74 couples approximately half of the light (light beam 76) through the coupler 74 to a waveguide 78 and half of the light (light beam 80) across the coupler 74 to a waveguide 82, as indicated by the internal arrows illustrated within the coupler 74. Next, the light beam 76 travels through two frequency dependent phase shifters 84 and 86, which alter the phase of the light beam 76 in a way that is frequency dependent. At the same time, the light beam 80 travels through two frequency dependent phase shifters 88 and 90, which alter the phase of the light beam 80 in a way that is frequency dependent. In one embodiment, the frequency dependent phase shifters 84, 86, 88, and 90 comprise ring resonators that introduce a non-linear phase response into the light beams 76 and 80. For example, FIG. 3 illustrates a fourth order filter, because it has four frequency dependent phase shifters. In alternate embodiments, the optical filter 22 may include a different number of phase shifters 84, 86, 88, and 90. For example, the optical filter 22 may be an eighth order filter (eight phase shifters), a sixth order filter (six phase shifters), and so forth.

The light beams 76 and 80 then enter the coupler 92. As the light beams are coupled together by the coupler 92, the light beams 76 and 80 interfere with each other. This interference, which is partially determined by the phase changes made to the light beams 76 and 80 by the frequency dependent phase shifters 84, 86, 88, and 90, creates a pass band 94 that exits an output port 96 of the coupler 92 into a waveguide 98. More specifically, the frequency dependent phase shifter 84 and 86 introduce one phase shift into the light beam 76 while the frequency dependent phase shifters 88 and 90 introduce another phase shift on the light beam 80. Then when the light beams 76 and 80 are recombined in the coupler 92, the two light beams create frequency dependent interference, and depending on the individual frequency within the light beams 76 and 80, the light passes through the filter (the passband 94). Light frequencies 100 that do not pass through the filter may be propagated back the optical isolator 21 via the output port 102 and the waveguide 70, as illustrated in FIG. 3.

Returning next to the second modulated optical beam 64, which is the complement of the first modulated optical beam 62, the beam 64 passes through the optical isolator 21 and into the waveguide 70 (block 48 of FIG. 2). The second modulated optical beam 64 then passes through the waveguide 70 and into the output port 102 of the coupler 92. As described above, the output port 102, which may be configured to act as a bidirectional port for the optical filter 22. The coupler 92 may then split the second modulated optical beam 64 into a light beam 106 and a light beam 108 (as indicated by the internal arrows illustrated within the coupler 92).

Once divided, as with the light beams 76 and 80 described above, the light beam 106 travels through two frequency dependent phase shifters 84 and 86 while, the light beam 108 travels through two frequency dependent space shifters 88 and 90. The light beams 106 and 108 then enter the coupler 74. As the light beams are coupled together by the coupler 74, the light beams 106 and 108 interfere with each other. This interference, which is partially determined by the phase changes made to the light beams 106 and 108 by the frequency dependent phase shifters 84, 86, 88, and 90, creates a pass band 110 that exits the input port 104 of the coupler 92 into a waveguide 112. Light frequencies 114 that do not pass through the filter may be propagated back to the optical isolator 21 via the input port 72 and the waveguide 68, as illustrated in FIG. 3.

It will be appreciated that in various embodiments, the filter 22 may be configured to emulate the response of a variety of suitable filter types, such as Butterworth, Chebyshev, and Elliptical. Advantageously, the filter 22 achieves a relatively narrow, box-like, bandpass response with a relatively low-order filter.

Focusing next on the passbands 94 and 110, the passbands 94 and 110 will follow waveguides 98 and 112, respectively, to the optical detectors 26. The optical detectors 26 are configured to detect the passband light beams 94 and 110 (block 52) and to convert the passband light beams 94 and 110 from optical beams into electrical signals, such a voltage-based EM signal, as indicated by block 54. In the illustrated embodiment, the optical detectors 26 include two detectors: a first photodiode 116 and a second photodiode 118, which are coupled together as a balanced pair. More specifically, first photodiode 116 is configured to convert the passband 110 into a first electrical signal and the second photodiode 118 is configured to convert the passband 94 into a second electrical signal.

The photodiodes 116 and 118 may also be electrically connected to produce a combined electrical signal representative of a difference between a light intensity received by the photodiode 116 and a light intensity received by the photodiode 118. For example, coupling the photodiodes 116 and 118 together in the manner illustrated in FIG. 3 enables the photodiodes 116 and 118 to perform a subtraction operation on the first electrical signal and the second electrical signal, as indicated by block 56. Advantageously, performing this subtraction operation on the electrical signals facilitates the removal of RIN.

More particularly, as described above, the modulator 16 produces two optical beams (the first modulated optical beam 62 and the second modulated optical beam 64) that are complements of each other. As such, those of ordinary skill in the art will appreciate that the first electrical signal and the second electrical signal, which are derived from the first modulated optical beam 62 and the second modulated optical beam 64, respectively, will be electrically out-of-phase from each other by approximately one-hundred and eighty degrees. On the contrary, the RIN on both the first modulated optical beam 62 and the second modulated optical beam 64 is synchronized (i.e., not complementary, electrical in-phase). Accordingly, performing an electrical subtraction on the first electrical signal and the second electrical signal will reduce the signal strength of the RIN noise. In other words, because the RIN signal strength in each signal is approximately the same, subtracting the RIN values will reduce or eliminate the RIN. However, as those of ordinary skill in the art will appreciate, because the first and second electrical signals are out-of-phase with each other, subtracting the first and second electrical signal will generate a narrowband output (the EM output 28) with a signal strength greater than or equal to the signal strengths of the first electrical signal or the second electrical signal, as indicated by block 58. As such, the balanced detectors 26 are able to increase the signal-to-noise ratio of the EM output 28.

In this way, the optical filter assembly 10 can produce a low-noise EM output 28 that corresponds to a narrowband frequency range from the EM input 18. In addition, because the optical filter assembly 10 can operate with a single optical filter 22, the optical filter assembly 10 may be less expensive, easier to calibrate, consume less power, and occupy less board or chip space than conventional optical filters that employ a pair of optical filters. For example, the optical filter assembly 10 is advantageously easier to calibrate than conventional systems, because there is no need to calibrate the response characteristics of two different optical filters to match each other.

Turning next to another embodiment, a plurality of optical filters 22 and optical detectors 26 may also be employed in conjunction to form an optical channelizer that can filter a plurality of different narrowband EM "channels," from the broadband signal 18. For example, in a broadband EM signal carrying frequencies in range somewhere between 1 gigahertz and 200 gigahertz, a channelizer can generate one channel including the frequencies between 1 gigahertz and 2 gigahertz, another channel for frequencies between 2 gigahertz and 3 gigahertz, and so forth.

Figure 4:
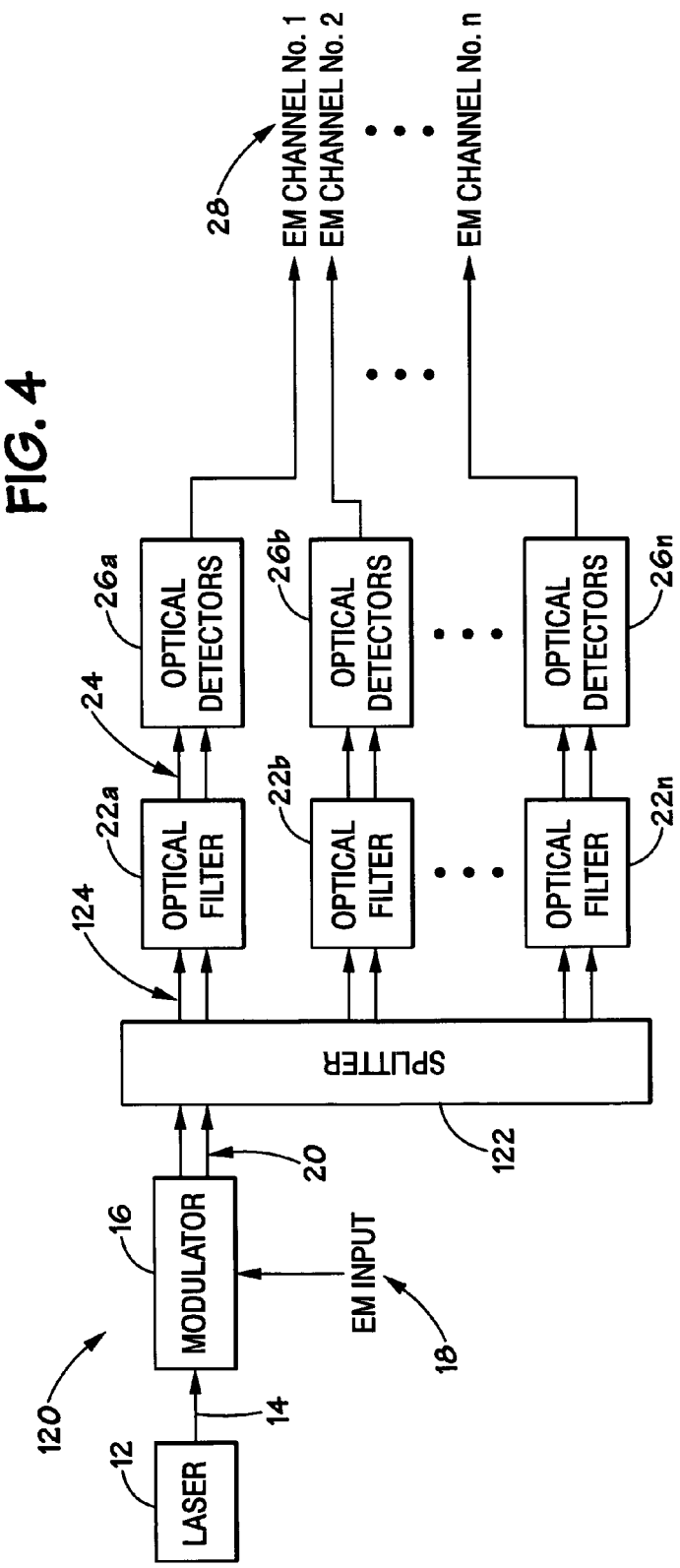
FIG. 4 is a block diagram of an exemplary optical channelizer in accordance with one embodiment.

More specifically, FIG. 4 is a block diagram of an exemplary optical channelizer 120 in accordance with one embodiment. For simplicity, like reference numeral have been used to designate those features previously described in regard to FIGS. 1 and 3. As with the optical EM filter 10, the channelizer 120 includes the laser 12 that is configured to direct the optical beam 14 at the modulator 16. Also, as described above, the modulator may be configured to modulate the EM Input 18 onto the optical beam 14 to produce one or more modulated optical beams 20. For ease of illustration, it is assumed for the purpose of FIG. 4, that an optical isolator, such as the optical isolator 21, is built into the modulator 16, as described above.

The modulated optical beams 20 may then be directed to a splitter 122, which is configured to split the modulated optical beams 20 into a plurality of sets of modulated optical beams 124. In one embodiment, the splitter 122 is configured to produce "n" disjoint pairs of modulated optical beams 124, where n is the number of EM channels that the channelizer 120 is configured to produce.

The splitter 122 may project the plurality of modulated optical beams 124 into a plurality of optical filters 22a-22n, which as described above, may be configured to filter the optical beams 124 for a particular target narrowband frequency. The filtered optical beams 24 may then be directed at a plurality of optical detectors 26a-26n that are configured to detect the filtered optical beams 24 and to convert the optical beams into electronic signals, as described above. Lastly, as described above, signal detectors 26a-26n may be configured to remove or reduce RIN (as described above) and to generate one or more EM channels 28 corresponding to the n frequency bands.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

We claim:

1. An apparatus comprising:
    an optical filter having first and second input ports and first and second output ports being part of the optical filter, the optical filter being configured to receive an optical beam pair comprising a first optical beam and a second optical beam having opposite polarities and transmit the first optical beam in a first direction through a first frequency dependent phase shifter configured to alter a phase of the first optical beam to the first output port in response to receiving the first optical beam at the first input port and being configured to transmit the second optical beam in a direction opposite to the first direction through a second frequency dependent phase shifter configured to alter a phase of the second optical beam to the second input port in response to receiving the second optical beam at the second output port; and
    first and second photodiodes, the first photodiode being located to be illuminated by light from the first output port and the second photodiode being located to be illuminated by light from the second input port.

2. The apparatus of claim 1, wherein the photodiodes are electrically connected to produce a combined electrical signal representative of a difference between a light intensity received by the first photodiode and a light intensity received by the second photodiode.

3. The apparatus of claim 2, wherein the photodiodes comprise a substantially balanced pair of photodiodes.

4. The apparatus of claim 1, wherein the apparatus is disposed on a silicon substrate.

5. The apparatus of claim 1, wherein the optical filter comprises a Mach-Zehnder filter.

6. The apparatus of claim 1, further comprising a tunable interferometer configured to direct the light to the first input port and the second output port.

7. The apparatus of claim 6, wherein the tunable interferometer is configured to direct light to the second output port such that the signal at the second output port is the complement of the signal directed to the first input port.

8. The apparatus of claim 6, wherein the tunable interferometer is configured to modulate light responsive to a received signal.

9. The apparatus of claim 1, wherein the optical filter comprises a stopband optical filter.

10. The apparatus of claim 1, wherein the optical filter comprises:
a waveguide, wherein the first frequency dependent phase shifter is coupled to the waveguide.

11. The apparatus of claim 10, wherein the frequency dependent phase shifter filter comprises a ring resonator.

12. A wireless receiver comprising:
an optical channelizer including:
a modulator configured to modulate an optical beam with a broadband communication signal and to split the modulated optical beam into an optical beam pair;
a splitter configured to receive the optical beam pair and to split the optical beam pair into a plurality of optical beam pairs; and
a plurality of optical filters, wherein each of the plurality of optical filters is configured to filter one pair of the plurality of optical beam pairs for a target narrowband frequency range.

13. The wireless receiver, as set forth in claim 12, comprising a plurality of optical detectors, wherein each of the plurality of optical detectors is configured to detect the one of plurality of filtered optical beam pairs.

14. The wireless receiver, as set forth in claim 12, comprising a signal processor configured to produce a plurality of EM channels based on the plurality of filtered optical beam pairs.

15. The wireless receiver, as set forth in claim 12, comprising an antenna configured to receive the broadband communication signal.

16. An apparatus comprising:
an optical filter having first and second input ports and first and second output ports, the optical filter being configured to transmit light in a target frequency range in a first direction through a waveguide to the first output port in response to receiving light at the first input port and being configured to transmit light in the target frequency range through the waveguide in a direction opposite to the first direction into the second input port in response to receiving light at the second output port;
a tunable interferometer configured to direct the light to the first input port and the second output port, wherein the tunable interferometer is configured to direct light to the second output port such that the signal at the second output port is the complement of the signal directed to the first input port; and
first and second photodiodes, the first photodiode being located to be illuminated by light from the first output port and the second photodiode being located to be illuminated by light from the second input port.

17. The apparatus of claim 16, wherein the photodiodes are electrically connected to produce a combined electrical signal representative of a difference between a light intensity received by the first photodiode and a light intensity received by the second photodiode.

18. The apparatus of claim 16, wherein the apparatus is disposed on a silicon substrate.

19. The apparatus of claim 16, wherein the tunable interferometer is configured to modulate light responsive to a received signal.

20. The apparatus of claim 16, wherein the optical filter comprises:
a waveguide; and
a frequency dependent phase shifter coupled to the waveguide, wherein the frequency dependent phase shifter filter comprises a ring resonator.

* * * * *